UNITED STATES PATENT OFFICE.

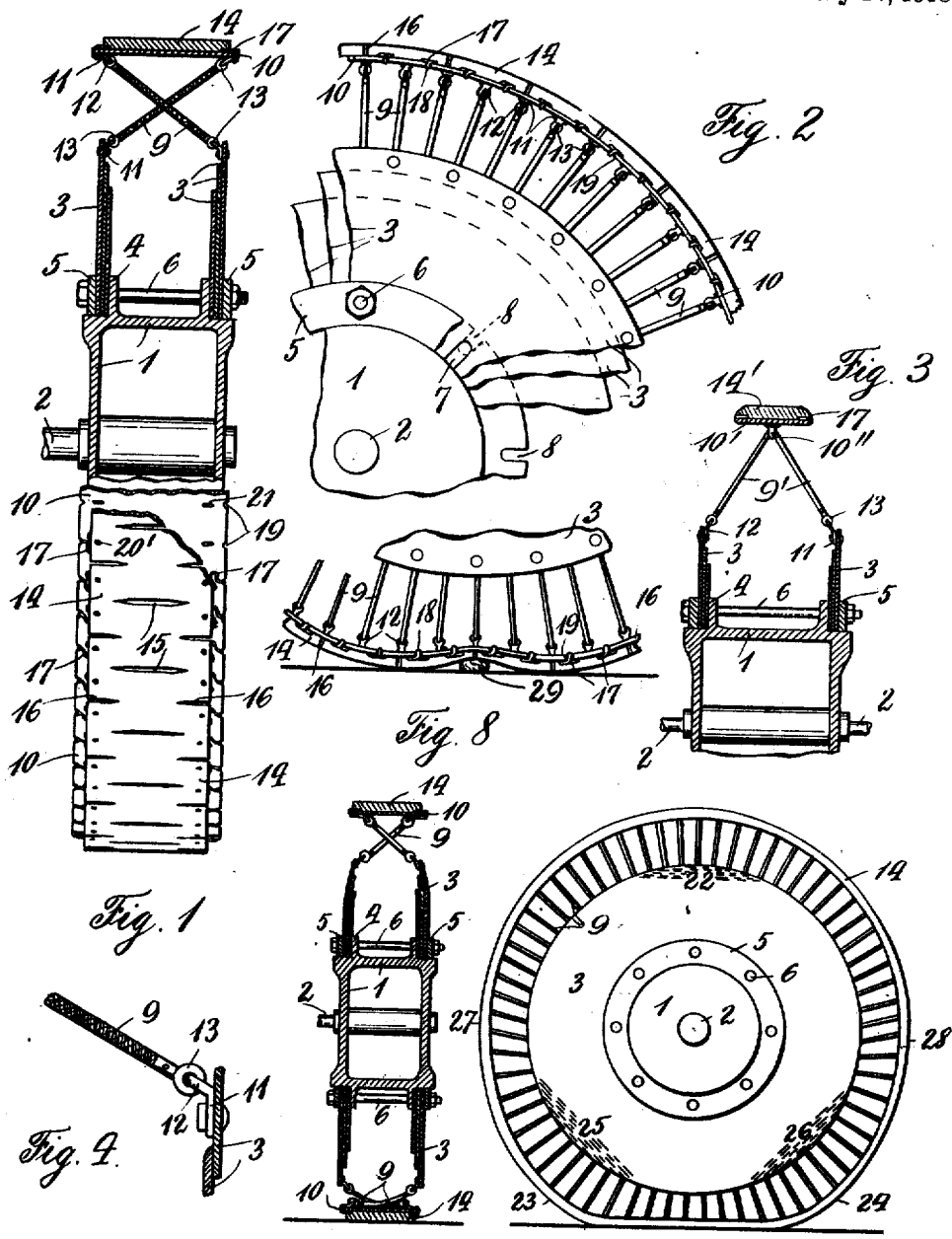

MANUEL S. DE CARMONA, OF MEXICO, MEXICO.

ELASTIC WHEEL.

1,272,923.  Specification of Letters Patent.  Patented July 16, 1918.

Application filed March 16, 1914. Serial No. 824,864.

*To all whom it may concern:*

Be it known that I, MANUEL S. DE CARMONA, a citizen of the Mexican Republic, and a resident of the city of Mexico, Mexico, have invented certain new and useful Improvements in Elastic Wheels, of which the following is a specification.

My invention relates to elastic wheels intended for carriages of various kinds, among which I will mention horseless carriages, trailers adapted to be drawn by horseless carriages, and vehicles adapted to be propelled or drawn by animal or human power. The object of my invention is to provide a simple, durable, and efficient wheel of this character, which will dispense not only with pneumatic tires, but in some cases even with the body-springs of the vehicle.

For this purpose, I have devised a special novel construction of an elastic wheel or spring wheel, in accordance with the principles explained hereinafter in connection with the accompanying drawings, which represent, as examples, two forms of my invention.

Reference is to be had to said drawings, in which Figure 1 is, in its upper portion, a transverse radial section, and, in its lower portion, an end elevation, of a wheel embodying my invention; Fig. 2 is a partial side elevation of the wheel; Fig. 3 shows in transverse section, a portion of a wheel differing slightly from the construction shown in Figs. 1 and 2; Figs. 4 and 5 show details of certain connecting members referred to hereinafter; and Figs. 6, 7, and 8 are respectively a complete side elevation, a transverse axial section, and a partial side elevation of the wheel, these three views illustrating the operation of my invention.

The new wheel comprises a central portion or hub 1, of rigid character, mounted on the shaft or axle 2. At both ends or faces of this hub or drum are secured elastic rings 3, all these rings being of the same interior diameter, but the several rings of one set (which are placed together face to face, their planes being perpendicular to the axis of the wheel) are of different radial widths, the innermost ring of each set having the smallest exterior diameter, and the diameter increasing from the innermost to the outermost ring. Each set of rings forms a graduated circular spring, similar, when viewed in cross section (Figs. 1, 3, and 7) to an ordinary leaf-spring such as used in carriages.

To properly hold these elastic rings, the hub 1 may be provided with shoulders or flanges 4 against which said rings are pressed by rigid securing rings 5 fitted around the outer portions of the hub, and by bolts 6 parallel to the axis of the wheel, with nuts screwed on one end of each bolt; the bolts pass through holes in the rigid clamping or securing rings 5, while the elastic rings 3 have inwardly open radial slots 7, and the flanges 4 outwardly open radial slots 8 for the reception of said bolts. Of course, (circular) holes might be substituted for the radial slots 7 and 8.

The outer edges of the widest elastic rings 3 of each set are connected by means of inclined runs 9 of wires or lacing or other suitable flexible material, with opposite edges of an exterior elastic ring or tire member 10, said runs or connections being inclined alternately in opposite directions, as will be seen best in Figs. 1, 2, and 7. The tire member 10 is simply a flat band bent to cylindrical curvature, made of steel or other suitable material. As alternate connections 9 extend from opposite ends of the tire member 10 to opposite rings 3, the connections will appear in the shape of an X in a section taken lengthwise of the wheel's axis, see Figs. 1 and 7.

It is not absolutely necessary that the connections 9 should cross each other, but in some cases, when a very high degree of elasticity is required, as with the landing wheels of aeroplanes, it will be preferable to arrange the connections 9' in V-fashion, as shown in Fig. 3, the two members of each V lying in the same (radial) plane, and all the connections 9' being secured to the central portion of the tire member 10'.

Any suitable construction may be adopted for connecting the wires (or the like) 9, 9' with the elastic rings 3 and with the tire member 10 or 10'. For example, angular brackets 11 of the shape shown best in Fig. 4, riveted or otherwise secured to the outer edges of the widest rings 3 and of the tire member 10, are each provided in its inclined portion with an opening 12 through which extends the connecting hook or eye 13 provided at each end of the several flexible connections 9, 9'. In Figs. 1, 2, and 6 to 8, one end of each connection 9 is secured to a ring 3 and the other end to the tire member 10; in Fig. 3, both ends of each connection 9' are secured to rings 3, and the central portion of each connection is engaged with a suitable eye or guide 10" fastened to the central portion of the tire member 10'.

On the outer surface of the tire member 10 or 10' is arranged the tread member or tread portion 14 or 14', made of rubber or other flexible and elastic material, but preferably of a material which is simply flexible, such as leather. This tread portion is an endless band, (originally) of slightly smaller diameter than the tire member 10 or 10' and provided with cuts or score lines, extending preferably in a transverse direction. Some of these incisions, as indicated at 15, are arranged on the central portion of the band, and do not extend to its edges; others, alternating in position with the incisions 15, extend inwardly from the edges; these edge cuts are designated by the reference numeral 16. These cuts allow the diameter of the tread band to be enlarged by stretching it, so that it may be placed on the tire ring 10 or 10'. Small springs 17 of the type shown in Fig. 5 are secured by one end to the respective edges of the tire member 10, as by means of hooks 18 arranged to fit into notches 19 at the edges of the tire member and by the other end to the tread band 14. The S-shaped or 8-shaped central portion of each spring lies flat between the adjacent surfaces of the tread band and of the tire member (see Fig. 1), and these springs tend to stretch the tread band transversely, thereby contracting or closing the incisions 15, 16 and thus diminishing the diameter of the tread band. The said band will thus be "shrunk" on the tire member, so as to adhere to it closely and to follow it in all its movements and deformations.

In order to prevent any longitudinal creeping of the tread band on the tire member, each of the springs 17 may be provided with a small projection 20 adapted to enter one of a series of evenly spaced holes or notches 21 of the tire member. The bent point or barb 20' passes through the tread band near its edge as shown in Fig. 1. When the tread band is made of rubber or like material (as at 14' in Fig. 3), the incisions 15 and 16 will be superfluous, it being sufficient to secure the edges of the band to those of the tire member 10' by the springs 17, it being understood that the diameter of the elastic tread band is such that the band will by its elasticity contract upon the tire member 10'.

The operation is very simple and readily understood. From an examination of the construction above described, it will be evident that every movement of the tire member 10 or 10' away from the shaft or axle 2 of the wheel, will cause the rings 3 to be flexed elastically at the corresponding portion of the wheel (see the upper part of Fig. 7), the oblique pull of the wires or other flexible connections 9 (or 9') bringing the outer edges of the opposing sets of rings 3 toward each other. On the other hand, every movement of the tire member toward the axis of the wheel, will simply cause the tire member to be deformed elastically, the connections 9 becoming slack at such points, as shown at the lower portion of Fig. 7. That is to say, the tire member or rim 10 or 10' is loose or "floating", being susceptible of deformation toward and from the axis, and being brought back to its original position by its own elasticity and by that of the rings 3.

Thus, in Figs. 6 and 7, the weight resting on the shaft or axle 2 causes said shaft or axle, together with the rigid hub 1 and the elastic rings 3 to move downward, so that these parts will move away from the upper portion of the tire member 10, the connections 9 at this part of the wheel causing the elastic rings 3 to be bent inward or toward each other, at the segment 22 indicated by horizontal dotted lines in Fig. 6. At the same time, the tire member 10 has become deformed (flattened) at its lower portion, where it is in contact with the ground; this portion of the tire member has thus come nearer the center or axis of the wheel, the connections 9 at this portion of the wheel becoming slack and sagging, as indicated at the bottom in Fig. 7. Since however the tire member is inextensible (of constant length), the flattening of its lower portion will produce two elastic deformations 23 and 24 in the opposite (outward) direction at each side of said flattened portion, the corresponding portions of the rings 3 being thereby deflected downwardly and inwardly, that is to say, toward each other, as indicated by the inclined dotted lines marking the segments 25 and 26 in Fig. 6. Inasmuch as the elastic rings are no longer plane when deformed at 22, 25, 26 in the manner just referred to, they will be stiffened considerably against any bending of the two rings 3 bodily lengthwise of the axis under strains such as tend to produce skidding; the stiffening influence of these bends or deflections 22, 25, 26 will be similar to the effect of strengthening ribs provided on said rings, but of course the position of these deflected portions or segments changes constantly as the wheel revolves. Furthermore, owing to the fact that the axle or shaft 2 is no longer at the center of the tire member, many of the connections 9 have ceased to lie in radial planes as they do normally, and as these connections become inclined with respect to radial planes, they cause the distance between the tire member and the rings 3 to be diminished, particularly at the points marked 27 and 28 in Fig. 6; this produces elastic deflections, either of the tire member which is thus brought closer to the rings 3, or of the said elastic rings 3. It will be obvious that the resultant of all these elastic reactions and flexions is directed vertically upward and passes through the axis of the wheel, so that the entire system is in equilibrium.

It will be observed that the tire member 10 or 10' may, without any objectionable result, be deformed to such an extent as to take a curvature of the opposite kind to its normal curvature, that is to say, the said tire member may even become concave in places, as indicated in Fig. 8, so as to yield to small obstacles (such as 29) in very much the same manner that an ordinary pneumatic tire is indented or deformed locally under similar conditions. I desire to point out, however, that the showing of deformations, etc., has been greatly exaggerated in Figs. 6, 7, and 8, for the purpose of illustrating the operation more clearly.

Any material of sufficient elasticity and strength may be employed in the construction of my improved wheel, for instance, vanadium steel, which is the preferred material for the rings 3 and the tire member 10 or 10'.

Since the elasticity of the wheel as well as its strength depends on the dimensions and the character of the materials employed, it will be obvious that I may construct wheels of any quality desired, from the extra-light and extra-elastic ones suitable for aeroplanes, to the strongest and stanchest for use on motor-trucks and military armored cars. I may obtain such a degree of elasticity that the ordinary body springs of the vehicle or craft may be dispensed with, with a resulting simplification of mechanism and increase in efficiency.

Various modifications may be made without departing from the nature of my invention as set forth in the appended claim.

I claim as my invention:

A spring wheel comprising a continuous flexible annular tread member deformable radially so that its portions may move toward and from the center of the wheel, a centrally-disposed hub, two spaced annular spring members located at opposite sides of the wheel and having their inner portions secured to said hub, the other edges of said spring members being of smaller diameter than said tread member and having an unobstructed movement toward and from each other lengthwise of the wheel's axis, and oblique connections extending from the tread member inwardly to the outer portions of said spring members, and acting to pull the said spring members toward each other at such points of the wheel periphery at which the tread member is deformed or bulged outwardly, thereby producing a local stiffening action in said spring members to brace them against lateral strains.

In testimony whereof, I have signed this specification in the presence of two subscribing witnesses.

MANUEL S. DE CARMONA.

Witnesses:
  JOHN D. VAN HORN,
  N. ARCOL.